April 18, 1950 W. E. BRADLEY 2,504,175
CONTRAST CONTROL CIRCUIT FOR TELEVISION SYSTEMS
Filed July 31, 1945
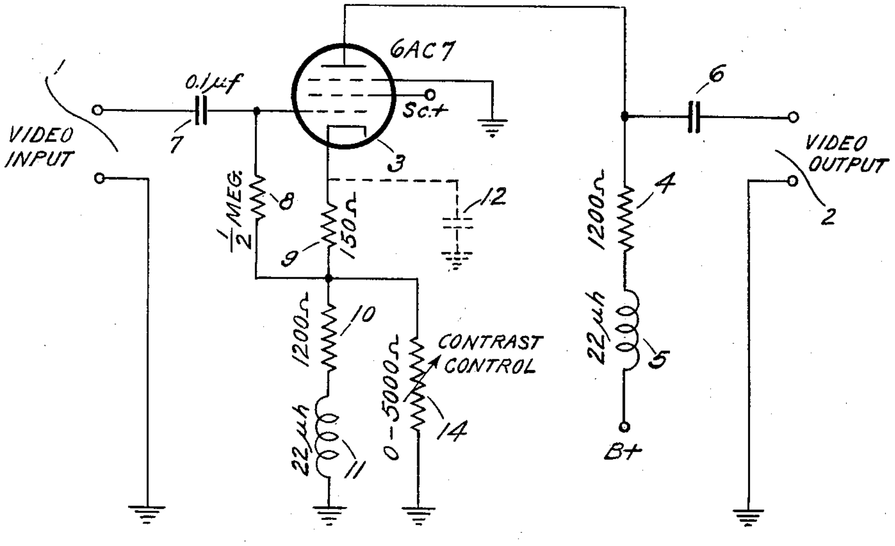
INVENTOR.
WILLIAM E. BRADLEY.
BY HIS AGENT
Carl H. Lynnestvedt Patented Apr. 18, 1950

2,504,175

UNITED STATES PATENT OFFICE 2,504,175

CONTRAST CONTROL CIRCUIT FOR TELEVISION SYSTEMS

William E. Bradley, Swarthmore, Pa., assignor, by mesne assignments, to Philco Corporation, Philadelphia, Pa., a corporation of Pennsylvania Application July 31, 1945, Serial No. 608,025

2 Claims. (Cl. 179—171)

This invention relates to video frequency amplifiers for television receivers and the like, and is directed to the problem of effecting picture contrast control without adversely influencing the amplifier's frequency response characteristic.

With the contrast control arrangements of the published art with which I am acquainted, and which heretofore have been considered to be in keeping with the best practice, it has been observed that the frequency response characteristic of the amplifier (and hence picture definition) changes as the gain of the amplifier is varied. In consequence, the frequency response characteristic of the amplifier is correct at only one setting of the contrast control. Preferably, of course, a television receiver should provide the best possible definition irrespective of the setting of the contrast control. It is a primary object of the present invention to provide such a contrast control arrangement.

The manner in which the principal object of the invention is attained will appear from the following detailed description and the accompanying drawing in which the single figure is a schematic diagram of a preferred embodiment of the invention.

In the drawing the invention is illustrated as applied to a single-stage video frequency amplifier having input terminals 1 and output terminals 2. The stage preferably employs a high-gain pentode amplifier tube 3 such, for example, as a 6AC7, or the like. The anode load circuit of the pentode 3 is conventional, and may comprise the series combination of a resistor 4 and a peaking coil 5. The values of the resistor 4 and the peaking coil 5 are so chosen that the amplifier stage has a desired gain versus frequency characteristic with the circuit adjusted for maximum gain, i. e. for maximum picture contrast. The amplified video frequency signal developed across the load circuit 4, 5 may be applied to a subsequent video frequency amplifier stage, or directly to the control grid of the picture tube (not shown), by way of a coupling condenser 6 and the video output terminals 2.

The video frequency input signals are applied to the grid circuit of the amplifier stage by way of the input terminals 1 and the grid coupling condenser 7. The grid may be biased to the desired extent by returning the grid leak 8 to the low potential end of a cathode resistor 9, after the practice common in the art.

The gain of the amplifier is controlled by varying the magnitude of a cathode load impedance which, electrically, is common to both the grid and plate circuits of the pentode 3. The presence of the cathode load impedance produces a degenerative, or gain decreasing, effect, the magnitude of which is proportional to the magnitude of the cathode load impedance. Stated differently, the gain of the stage is inversely proportional to the magnitude of the said cathode load impedance. The novelty of the present invention resides in the especial arrangement of this variable cathode load impedance.

In the embodiment illustrated, the cathode load impedance comprises, inter alia, a resistor 10 and an inductance coil 11. These elements are connected serially in the cathode circuit of tube 3, and are common to both the grid and anode circuits thereof. The values of the resistor 10 and coil 11 are so chosen as to cooperate with the cathode-to-ground capacitance 12 (the presence of the self-biasing resistance 9, if small compared to resistance 10, may be disregarded) to develop a substantially constant impedance across the entire video frequency band, usually the highest impedance consistent with the required band width and the magnitude of the shunting capacitance 12. The series-connected elements 10 and 11 are shunted by a variable resistor 14. This resistor controls the magnitude of the effective impedance of the cathode load circuit, and hence the gain of the stage, or, in other words, the contrast of the picture. Preferably, in the high resistance position of the control resistor 14 the shunting effect thereof is negligible and accordingly the degenerative effect of the cathode load impedance 10, 11, 12 is large. Conversely, at the other end of the control range, the resistance of the element 14 should be small compared to that of resistor 10 so that, in this position, the series-connected elements 10 and 11 are effectively short-circuited thereby.

Ordinarily the values of the cathode load elements 10 and 11 will be of the same order of magnitude as the values of the anode load elements 4 and 5. With reference to the exemplary circuit constants applied to the drawing it will be observed that the fixed anode and cathode impedances are identical. In practice these particular values have been found to provide a degree of picture definition which is substantially independent of the setting of the contrast (i. e. gain) control.

By the present invention there is provided a contrast control circuit which introduces no deleterious capacity in shunt with the associated amplifier's anode load circuit; in consequence the maximum gain of the stage is appreciably greater than that obtainable in a stage in which the gain or contrast is controlled through the agency of an anode load circuit potentiometer. Moreover, since the cathode load impedance is frequency-compensated to provide a substantially constant impedance over the pass band of the amplifier, variations in picture definition with changes in picture contrast (video gain) are effectively eliminated or diminished. The arrangement also possesses the property that, for contrast control settings which correspond to less than maximum stage gain (the usual case in the reception of strong television signals), the amplitude distortion which would otherwise be introduced by the stage is reduced as a result of the cathode degeneration herein described.

I claim:

1. A video-frequency amplifier, the gain whereof is controllable to effect changes in picture contrast, said amplifier comprising: a vacuum tube having at least grid, cathode and anode elements, means including a grid leak resistor and a source of substantially fixed voltage connected in series between said grid and cathode and effective to maintain a substantially fixed grid-to-cathode bias voltage, a video-frequency input circuit coupled to said grid, a video-frequency output circuit coupled to said anode, a frequency-compensated cathode load impedance common to both the grid-cathode and anode-cathode circuits of said tube, said cathode load impedance having a substantially constant impedance over the frequency range extending from approximately zero cycles per second to the highest video frequencies to be amplified, and a variable resistor connected directly in shunt with said cathode load impedance, said resistor being effective throughout said frequency range uniformly to control the degenerative effect of said cathode load impedance and hence the gain of said amplifier.

2. A video-frequency amplifier as claimed in claim 1, characterized in that said source of substantially fixed voltage comprises a resistor connected in the space-current path of said vacuum tube between said cathode and said grid leak.

WILLIAM E. BRADLEY.

REFERENCES CITED

The following references are of record in the file of this patent:

UNITED STATES PATENTS

| Number | Name | Date |
|---|---|---|
| 1,978,008 | Bussard | Oct. 23, 1934 |
| 2,173,232 | Landon | Sept. 19, 1939 |
| 2,264,715 | Rohr | Dec. 2, 1941 |
| 2,273,432 | Brewer | Feb. 17, 1942 |
| 2,280,605 | Roberts | Apr. 21, 1942 |